(12) United States Patent
Mott et al.

(10) Patent No.: US 10,163,267 B2
(45) Date of Patent: Dec. 25, 2018

(54) SHARING LINKS IN AN AUGMENTED REALITY ENVIRONMENT

(71) Applicant: A9.com, Inc., Palo Alto, CA (US)

(72) Inventors: David Creighton Mott, Los Altos, CA (US); Arnab Sanat Kumar Dhua, Mountain View, CA (US); Colin Jon Taylor, Orinda, CA (US); Scott Paul Robertson, Mountain View, CA (US); William Brendel, San Francisco, CA (US); Nityananda Jayadevaprakash, San Jose, CA (US); Kathy Wing Lam Ma, Markham (CA)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/248,944

(22) Filed: Aug. 26, 2016

(65) Prior Publication Data

US 2017/0053451 A1   Feb. 23, 2017

Related U.S. Application Data

(63) Continuation of application No. 14/229,678, filed on Mar. 28, 2014, now Pat. No. 9,432,421.

(51) Int. Cl.
*G06T 19/00* (2011.01)
*H04W 4/02* (2018.01)
(Continued)

(52) U.S. Cl.
CPC ........ *G06T 19/006* (2013.01); *G06F 3/04815* (2013.01); *H04W 4/025* (2013.01);
(Continued)

(58) Field of Classification Search
CPC .. G01C 21/005; G01C 21/32; G01C 21/3647; G01C 21/3679; G06K 9/46;
(Continued)

(56) References Cited

U.S. PATENT DOCUMENTS 8,239,130 B1 * 8/2012 Upstill ............... G01C 21/3679
                                                 701/400
8,315,423 B1   11/2012 Jing
(Continued)

OTHER PUBLICATIONS

"Non Final Office Action dated Feb. 10, 2016" received in U.S. Appl. No. 14/229,678.
(Continued)

*Primary Examiner* — Haixia Du
(74) *Attorney, Agent, or Firm* — Hogan Lovells US LLP

(57) ABSTRACT

Various embodiments provide methods and systems for users and business owners to share content and/or links to visual elements of a place at a physical location, and, in response to a user device pointing at a tagged place, causing the content and/or links to the visual elements of the place to be presented on the user device. In some embodiments, content and links are tied to specific objects at a place based at least in part upon one of Global Positioning System (GPS) locations, Inertial Measurement Unit (IMU) orientations, compass data, or one or more visual matching algorithms. Once the content and links are attached to the specific objects of the place, they can be discovered by a user with a portable device pointing at the specific objects in the real world.

17 Claims, 12 Drawing Sheets

(51) Int. Cl.
*G06F 3/0481* (2013.01)
*G01C 17/00* (2006.01)
*G01C 21/16* (2006.01)
*G01S 19/13* (2010.01)

(52) U.S. Cl.
CPC .............. *G01C 17/00* (2013.01); *G01C 21/16* (2013.01); *G01S 19/13* (2013.01)

(58) Field of Classification Search
CPC .............. G06K 9/6211; G06K 9/00624; G06K 9/00208; G06F 17/30247; G06T 19/006; H04N 21/4524
See application file for complete search history.

(56) References Cited

U.S. PATENT DOCUMENTS

| | | | | |
|---|---|---|---|---|
| 8,566,029 | B1* | 10/2013 | Lopatenko | G08G 1/0962 701/400 |
| 8,938,091 | B1* | 1/2015 | Anguelov | G06F 17/30241 340/988 |
| 9,223,902 | B1 | 12/2015 | McHugh | |
| 2010/0103286 | A1* | 4/2010 | Akiyama | G03B 7/28 348/231.6 |
| 2010/0184451 | A1 | 7/2010 | Wang | |
| 2011/0173067 | A1* | 7/2011 | Herbst | G01C 21/3638 705/14.49 |
| 2011/0314049 | A1 | 12/2011 | Poirier | |
| 2012/0047037 | A1* | 2/2012 | Ueda | G06K 9/00 705/23 |
| 2013/0034295 | A1* | 2/2013 | Tsuchinaga | G06K 9/6857 382/153 |
| 2013/0328926 | A1 | 12/2013 | Kim | |
| 2014/0129625 | A1* | 5/2014 | Haugen | H04W 4/08 709/204 |
| 2015/0202962 | A1* | 7/2015 | Habashima | B60K 35/00 345/633 |

OTHER PUBLICATIONS

"Notice of Allowance dated May 10, 2016" received in U.S. Appl. No. 14/229,678.

* cited by examiner

SHARING LINKS IN AN AUGMENTED
REALITY ENVIRONMENT

This application is a continuation of allowed U.S. application Ser. No. 14/229,678 entitled "SHARING LINKS IN AN AUGMENTED REALITY ENVIRONMENT," filed Mar. 28, 2014, which is incorporated herein by reference for all purposes.

BACKGROUND

Portable computing devices are increasingly powerful and affordable. Users are relying upon portable computing devices to handle various types of tasks. For example, a user can use a portable computing device to search information about a restaurant, store, or other place of interest before deciding whether to visit. However, in such a situation, the user may have to launch a map, a search engine, or other similar application to look up information such as the location of the place even if the place is close-by or in the view of the user. Further, inputting the search query and reviewing the results could take more time than the time to check out the place in the real world.

BRIEF DESCRIPTION OF THE DRAWINGS

Various embodiments in accordance with the present disclosure will be described with reference to the drawings, in which.

DETAILED DESCRIPTION

Figure 1A:
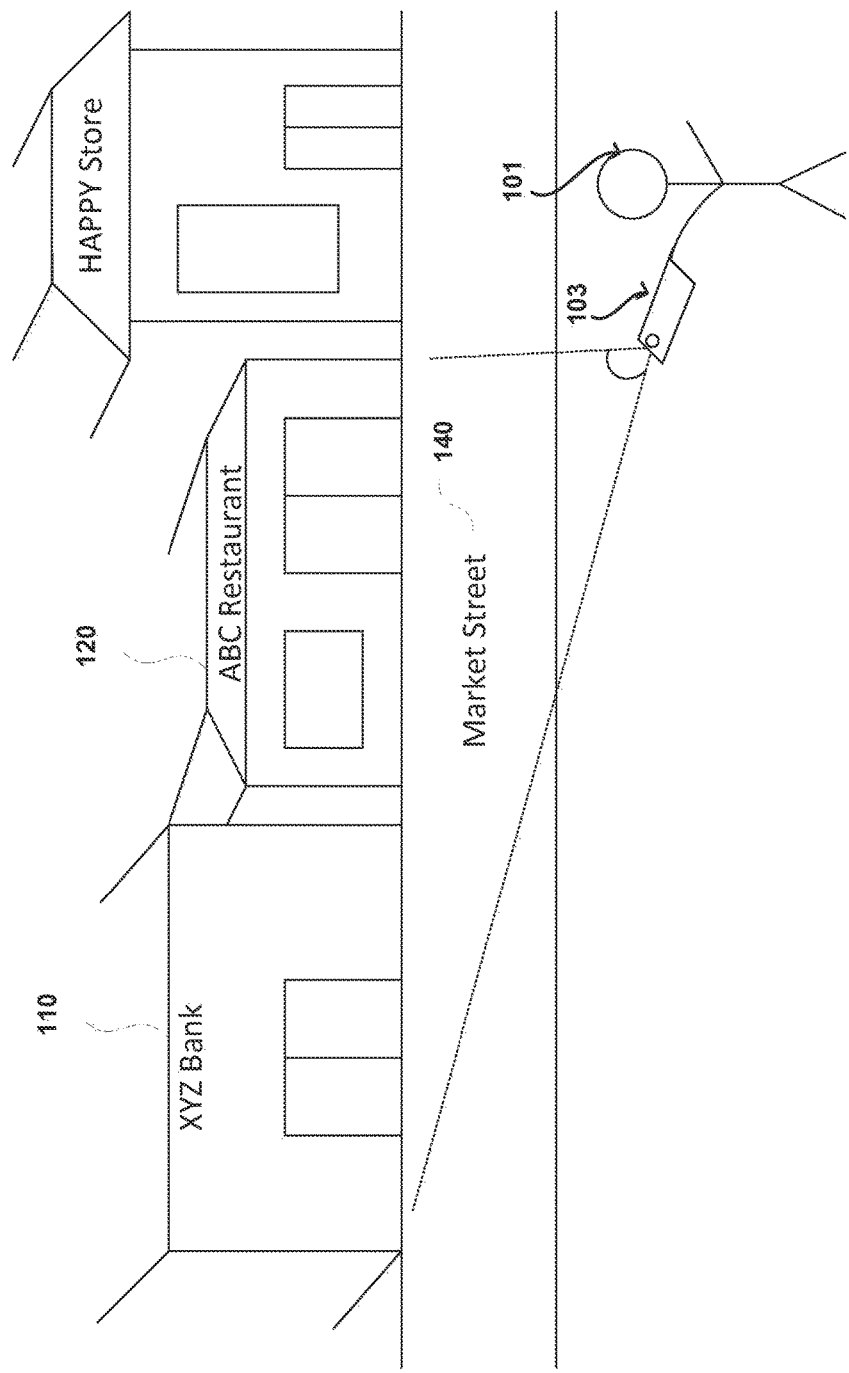
FIG. 1A illustrates an example of a point of interest in the real world in accordance with various embodiments.

Systems and methods in accordance with various embodiments of the present disclosure overcome deficiencies in conventional approaches in sharing content. In particular, various embodiments enable users and business owners to attach content and/or links to visual elements of a place at a physical location, and, in response to a user's portable device pointing at a tagged place, cause the content and/or links to the visual elements of the place to be presented on the portable device. The content and/or links can refer to various types of information, for example, but are not limited to, promotional coupons, menus, advertisements, reservation systems, floor plans, videos, audio, wait time, customer reviews, music, chat walls, attractions of the place, instant or daily specials, recommendations on specific items, hyperlinks to reviews of the place on third party review sites, or other alternative places, etc. In some embodiments, content and links are tied to specific objects at a place based at least in part upon one of Global Positioning System (GPS) locations, Inertial Measurement Unit (IMU) orientations, compass data, or one or more visual matching algorithms. Once the content and links are attached to the specific objects of the place, they can be discovered by a user with a portable device pointing at the specific objects in the real world. At least some embodiments cause content and/or links to a physical location to be presented on a user's device based at least upon one of the proximity of the user to the physical location, a point of view of the user, a user profile of the user (e.g., user demographic and preferences), or a profile of an owner of the physical location.

In some embodiments, images submitted by users and/or an owner of a point of interest (e.g., a place, a scene, an object, etc.) are used as fiducials to assist recognition and tracking of the point of interest. Multiple images of a point of interest taken from different points of view (e.g., crowd-sourced) can be dynamically used as fiducials for recognition and tracking of the point of interest. As a user with a user device moves through a point of interest in the real world, a different unique image (i.e., fiducials) can be chosen from a set of stored candidate images of the point of interest based at least upon GPS locations, IMU orientations, or compass data of the user device.

At least some embodiments provide various methods to control the types of content and links that can be attached to a physical place in an augmented reality environment, and/or how the attached content and links can be presented. For example, through one or more types of authentication processes, an owner of a physical place may get access to an augmented reality environment associated with his or her place. Upon authentication, the owner can provide some inputs on the types of content and links attached to the place, and/or how the attached content and links are presented (e.g., a blank wall or whole business-front, layout, or visual elements to be attached). In some embodiments, a suitable communication means (e.g., a canvas or chat blog) is provided for a user to attach content (e.g., texts, images, or videos) to a visual element at a point of interest, and interact with other users who have left messages there, which can provide a form of sharing beyond what regular social network sites can offer.

In some embodiments, when a user or owner takes an image at a point of interest with a user device, the point of interest can be determined based at least in part upon a point of view of the user, or one or more visual features of the image. The point of view of the user can be determined based at least in part upon GPS locations, IMU orientations, or compass data of the user device. As a part of image processing, an indication may be provided to the user or owner about the quality of the captured image so that suitable images can be submitted for image matching. For example, an image with unique visual features works better in image matching than the one that is featureless. In some instances, the scaled indication (e.g., a scale of 0 to 10, or strong/medium/bad) can be provided to the user. Unless the quality of an image crosses a minimum threshold, the image is not allowed to be submitted.

Some embodiments allow a user to take a self-guided tour of a point of interest in an augmented reality environment by pointing a user device with a camera at the point of interest in the real world and then receiving different links, files and/or content related to the point of interest for each image on the camera view of the user device. Various other functions and advantages are described and suggested below as may be provided in accordance with the various embodiments.

FIG. 1A illustrates an example of a point of interest in the real world in accordance with various embodiments. In this example, a user 101 with a computing device 103 can be seen moving through the Market Street 140. Although the client device is not shown in FIG. 1A, it should be understood that various types of electronic or computing devices that are capable of receiving and/or processing images in accordance with various embodiments are discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS. The computing device 103 may have one or more image capture elements (not shown), such as one or more cameras or camera sensors, to capture images and/or videos. The one or more image capture elements may include a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies. The computing device 103 may have one or more audio capture devices (not shown) capable of capturing audio data (e.g., word commands from the user 101).

In this example, the user 101 desires to obtain relevant information about the XYZ Bank 110 and the ABC Restaurant 120 using the computing device 103 to determine whether to cross the Market Street 140 to stop by the places. The user 101 can aim one or more image capture elements located on the computing device 103 to capture live view of at least a portion of the XYC Bank 110 and the ABC Restaurant 120. The XYC Bank 110 and the ABC Restaurant 120 may be recognized by analyzing and comparing the captured image(s) or feature(s) with stored images related to the place in a database. In some embodiments, image recognition may require a still image rather than a live view. The user 101 may be required to capture a still image (e.g., press a shutter button) for the purpose of image recognition.

Many embodiments provide imaging processing algorithms and recognition techniques to recognize a point of interest by matching the feature(s) or image of the point of interest against saved images in a database. For example, optical character recognition (OCR) can be used as a primary image analysis technique or to enhance other processes. Features (e.g., shape, size, color and text) of the point of interest can be extracted and matched against points of interest determined in the vicinity of the user 101's location. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various techniques (e.g., OCR and other text recognition processes) can be used as the primary image analysis technique or to enhance other processes. Some techniques are described in co-pending U.S. patent application Ser. No. 14/094,655, filed Dec. 2, 2013, entitled "Visual Search in a Controlled Shopping Environment," which are hereby incorporated herein by references in their entirety.

Figure 1B:
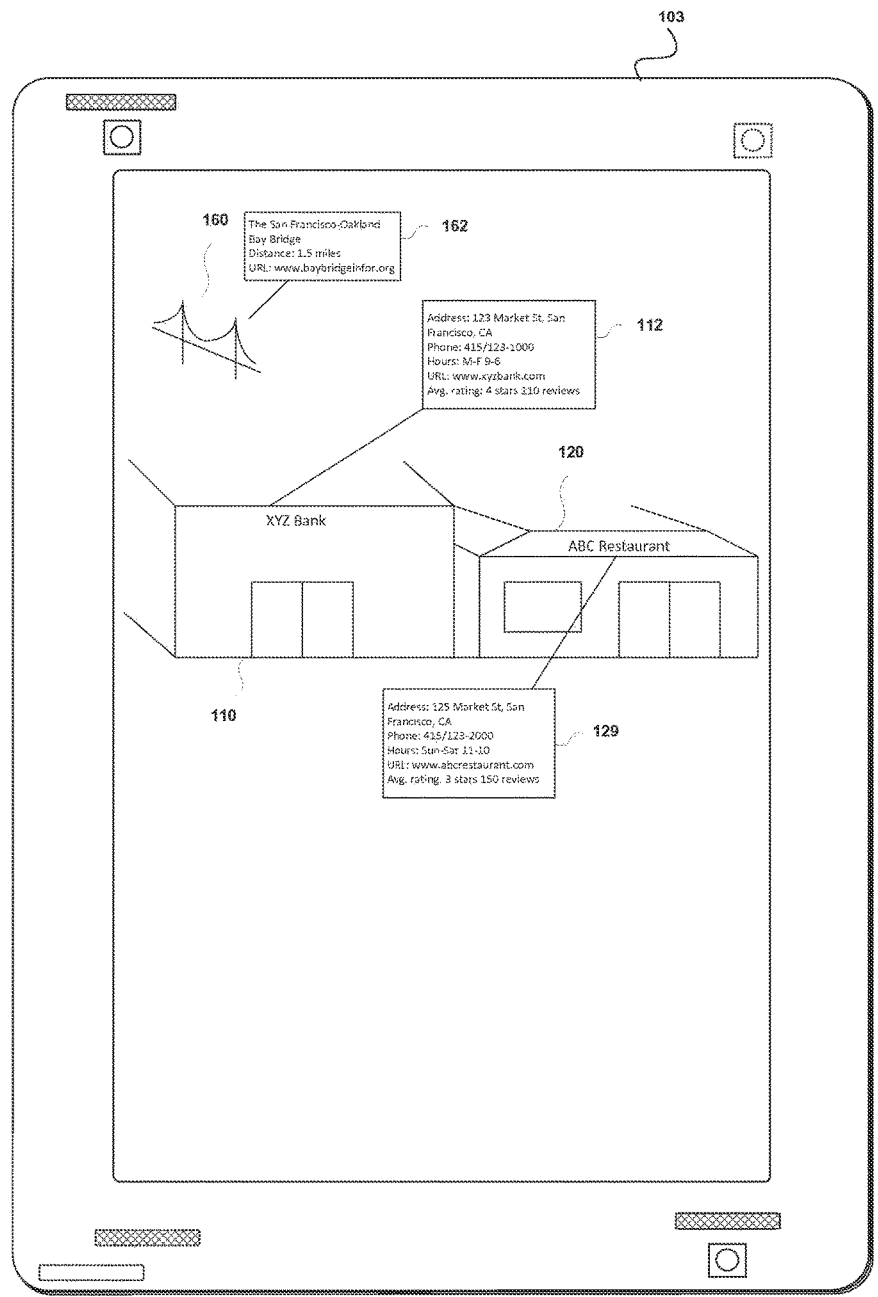
FIGS. 1B and 1C illustrate examples of sharing content and links related to a point of interest in an augmented reality environment in accordance with various embodiments.

Once the XYZ Bank 110 and the ABC Restaurant 120 are recognized, stored content and links that are associated with the places can be provided based at least upon the captured image data in real time, which is illustrated in FIG. 1B. The content and/or links presented on the user device may include an address, a phone number, business hours, a way to make reservations, and/or customer review of the point of interest. In this example, the content listed in the billboard 112 includes an address, phone number, URL, price rating, food critic review, menu/product inventory, reservation service, and user review for the XYZ Bank 110 while the content listed in the billboard 129 includes an address, phone number, URL, and customer rating for the XYZ Bank 120. In some instances, the content elements in the billboards 112 and 129 can be interactive. For example, the user 101 may select the URL address, www.xyzbank.com, to open up a webpage of the XYZ Bank 110, or dial the phone number listed in the content 112 by tapping the number.

Depending on the distance between a user and a point of interest, different levels of detail information (e.g., content and links) related to the point of interest may be presented to the user or allow the user to submit into a database. As the user is getting closer to the point of interest, certain content and/or links (e.g., an instant discount) may be shown on the user device. In some embodiments, depending on the fiducials that the user device is pointing at, a different set of content and/or links may be presented to the user. In some embodiments, based upon a point of view of a user, certain content and links are shown to the user in small fonts or icons. The user 101 may get more details of these fonts or icons by selecting the small fonts or icons, or magnifying a display area corresponding to the small fonts or icons.

In some embodiments, content and links presented on a user device can be determined based at least in part upon a user profile or the location of the user device. In this example, if the user 101 is determined to be a first time visitor to San Francisco, an icon or symbol of a landmark (e.g., the San Francisco-Oakland Bay Bridge 160) that is in the direction or in the vicinity of a user device may be presented on the user device, together with an explanatory billboard 162. The billboard 162 includes some tourist information regarding the landmark (e.g., the distance and URL of the Bay Bridge 160). In some embodiments, points of interest or landmarks in the direction of a user device have to meet a predetermined set of conditions to be presented on a user device. The predetermined set of conditions include such as, but are not limited to, whether the points of interest are within a predetermined number of miles, having a threshold review rating, or within a predetermined degree of orientation of the user device.

In some embodiments, the information of a point of interest presented to a user can be customized based at least upon the user profile or GPS locations, weather conditions, compass, or a degree of relevancy to the point of interest. The customization of the information may include choosing what types of information being presented and/or how the information is presented on the user device. For example, the information pertinent to a restaurant may include subject matters, such as the type of food served, menu, price, user reviews, professional critic reviews, etc. In some embodiments, information deemed more relevant the user may be displayed more prominently than those less relevant. If a user desires more information about a point of interest, the user may magnify or zoom the point of interest on a user device.

Figure 1C:
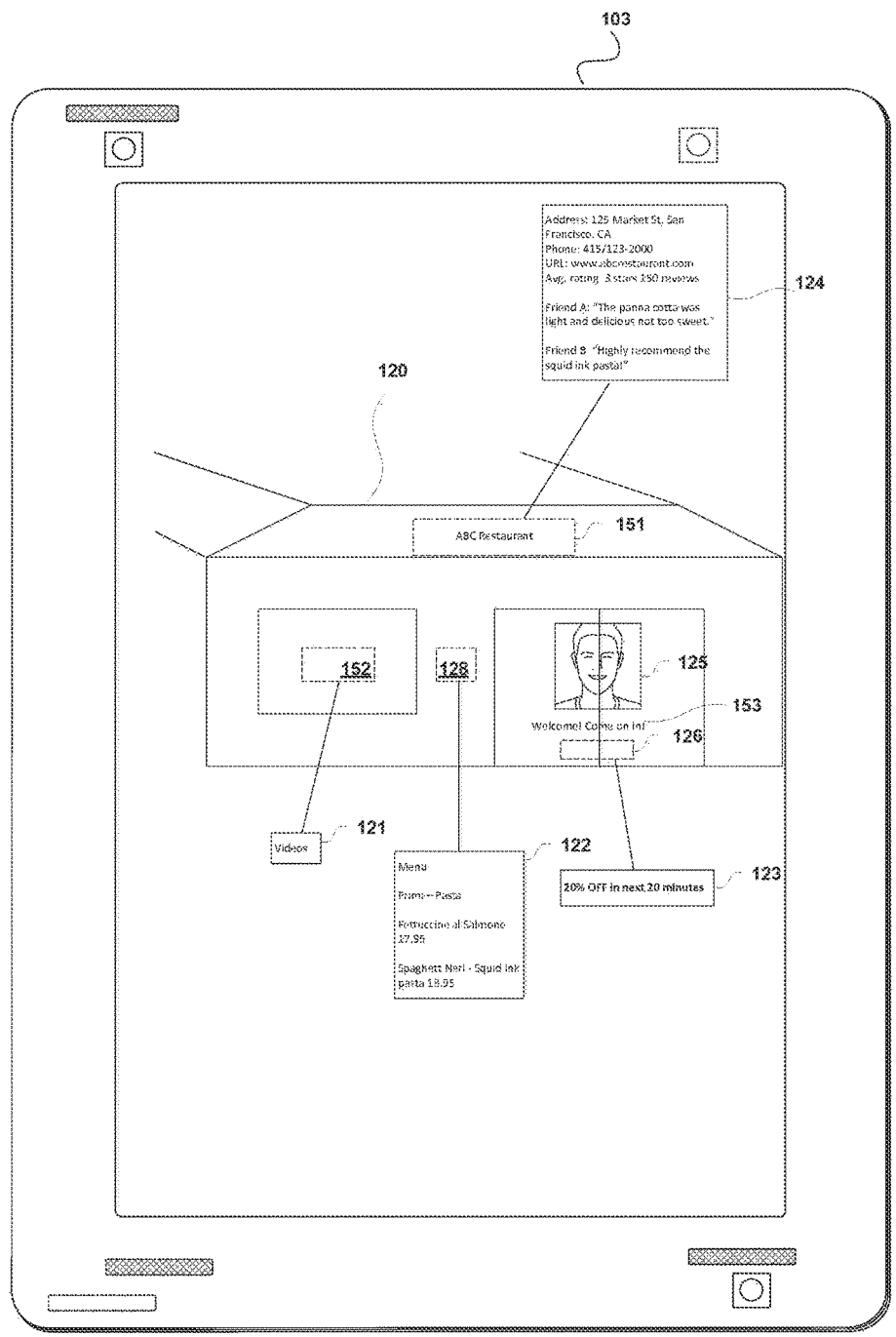

Various embodiments enable a user to share a variety of information related to a point of interest within a point of view of the user. FIG. 1C illustrates an example of sharing content and links related to a point of interest in an augmented reality environment in accordance with various embodiments. In this example, a user interface is provided to present an overlay of live view of the ABC Restaurant 120. The overlay can be transparent or have different levels of transparency. In some embodiments, a blank canvas or a webpage may be provided for a user to share content and links related to visual elements of a point of interest. The canvas or webpage may also present content and/or links related to the visual elements that were submitted by other users. The user may be allowed to edit or delete the content, comments or links that were submitted earlier by himself or herself.

In some embodiments, various types of markers can be used to anchor content and/or links submitted by users. In this example, the user or owner of the restaurant can designate certain areas with various sizes (e.g., rectangular 151, 152, 126 and 128 in dashed lines) to anchor different types of content and links related to the features of the ABC Restaurant 120. The size, style, fill ratio or transparency percentage of a marker can be customized by the users or owner.

In some embodiments, a user may outline a particular display area on the user device, which corresponds to a visual element of a point of interest, to submit comments, content, or links related to the point of interest. The user can use the particular display area on the user device to emphasize the feature(s) that the user would like to attach content and/or links to. In some embodiments, an indication (e.g., different colors or strong/medium/weak) can be provided to a user on whether a particular display area of a point of interest is good enough to be designated as a marker. The user may be prompted to move the user device around the point of interest to determine how likely the features corresponding to the particular display area can be matched against those from different views.

At least some embodiments enable an owner of a point of interest to control over at least in part what types of content and link that can be attached to a physical place in an augmented reality environment, or how the content and links can be presented. For example, an owner of a point of interest in the real world may customize or personalize a platform (e.g., a canvas or overlay) in the augmented reality environment for users to submit files, content, and/or links related to the point of interest. In some embodiments, one or more types of privacy policies may be implemented to guide or flag content and/or links that are submitted. For example, "User's registration is not required. Any user can submit content or links without logging in with a username, in which case they will be identified by network IP address."

Some embodiments provide one or more methods for an owner of a point of interest to authenticate himself or herself in an augmented reality environment. In some instances, the owner may have to answer correctly a series of questions related to at least one of the history of the point of interest, or a profile of the owner on the record. In some embodiments, a GPS based authentication system can be used to verify whether the claimed owner of a point of interest has been to the place with a minimum threshold of frequency. Once an owner of a point of interest gets authenticated, the owner can be enabled to control at least in part what types of content and link that can be attached to the point of interest in an augmented reality environment, or how the content and links can be presented (e.g., the layout of the markers, or how many links attached to each marker). In some embodiments, an owner of a point of interest may prohibit users to submit content and/or links to the point of interest in an augmented reality environment, or may require a user to have a minimum privilege level to do so. In some other embodiments, an owner of a point of interest may allow a user to attach whatever content and/or links the user would like, or freely attach content and/or links the way the user likes.

The content and links presented on a canvas or overlay of a point of interest can include subject matters of the point of interest such as, but are not limited to, attractions of the point of interest, instant or daily specials, recommendations on specific items, hyperlinks to reviews of the point of interest on third party review sites, or other alternative point of interest (e.g., proximity, or reviews) based on a user's profile and preferences. In some embodiments, if the user has registered an account with a point of interest, a user interface may be provided for the user to log into his or her account without launching other application or web browser. For example, if the point of interest is a bank, the user can log in on the user interface to check balances and make transactions. If the user desires, the user's log in information can be saved. The user interface (e.g., a canvas or overlay) may automatically log in the user's account in subsequent accesses.

Some embodiments present content and/or links related to a point of interest in various ways (e.g., glowing effect, bold effect, billboard effect, or a visual 3D element). In the FIG. 1C, the canvas or overlay of the ABC Restaurant 120 comprises the designated area 151, 152, 128, and 126 for users or owner to submit content or links related to the ABC Restaurant 120. The designated area 151 includes the billboard 124 to display an address, phone number, URL, and user reviews (e.g., reviews from Friends A and B) for the ABC Restaurant 120. The designated area 152 includes the billboard 121 of videos. The designated area 128 includes the billboard 123 to display a menu 122 of the ABC Restaurant 120. The designated area 126 includes the billboard 123 to display an instant coupon in bold to draw the user 101's attentions. The canvas or overlay of the ABC Restaurant 120 may also have a picture of the smiling owner 125 inviting the user 101 to visit the Restaurant 120, "Welcome! Come on in!" 153. In some instances, the picture of smiling owner 125 may be a 2D hologram image with the owner facing the direction of a user as the user walks by the front door.

In some embodiments, content and/or links presented on a user device of a user is determined based at least in part upon profile (e.g., demographic or preferences) of the user.

For example, a close-by store may present an instant discount link of a necktie if a user is male, and present a discount link of a formula if a user is determined to be a new mom. In some embodiments, one or more machine learning algorithms can be used to analyze user profiles and/or behavior from a group of users (e.g., crowd-sourced data). The group of users may share at least one common traits with the user. For example, a discount coupon or sale item that is particular attractive to the same group of users as the user may be presented on the user device. In some embodiments, content and/or links presented on a user device of a user is determined based at least in part upon various viewing perspective (e.g., weather conditions, outdoor or indoor, day or night time) from the user.

A user may find the content and/or links presented on a user device helpful or not helpful for him or her to determine whether to stop by the point of interest. The user is enabled to comment on the canvas whether content and links presented are helpful. The user may explicitly comment on the content and/or links. In some embodiments, such feedback from the user can be determined implicitly. For example, the user may show some interests by clicking on the links, magnifying a display area corresponding to certain content presented, or focusing on certain content over a threshold period of time (e.g., determined by head tracking, gaze tracking, or eye tracking techniques).

In some embodiments, user reviews related to a point of interest can be collected and extracted from comments of users that have left on a canvas or overlay of the point of interest, or various type of sources such as, but are not limited to, social networking sites, newspaper and magazines, search engines, local directory services, and/or third party service providers. In some embodiments, the average review rating can be calculated based on a weighted average of collected explicit and inexplicit comments from users. Comments from different groups of users may be assigned different weights in the calculation. For example, reviews from a user's friends (e.g., contacts in user's address book on a user device or a social networking site) may have a higher weight than reviews from other users.

Figure 2A:
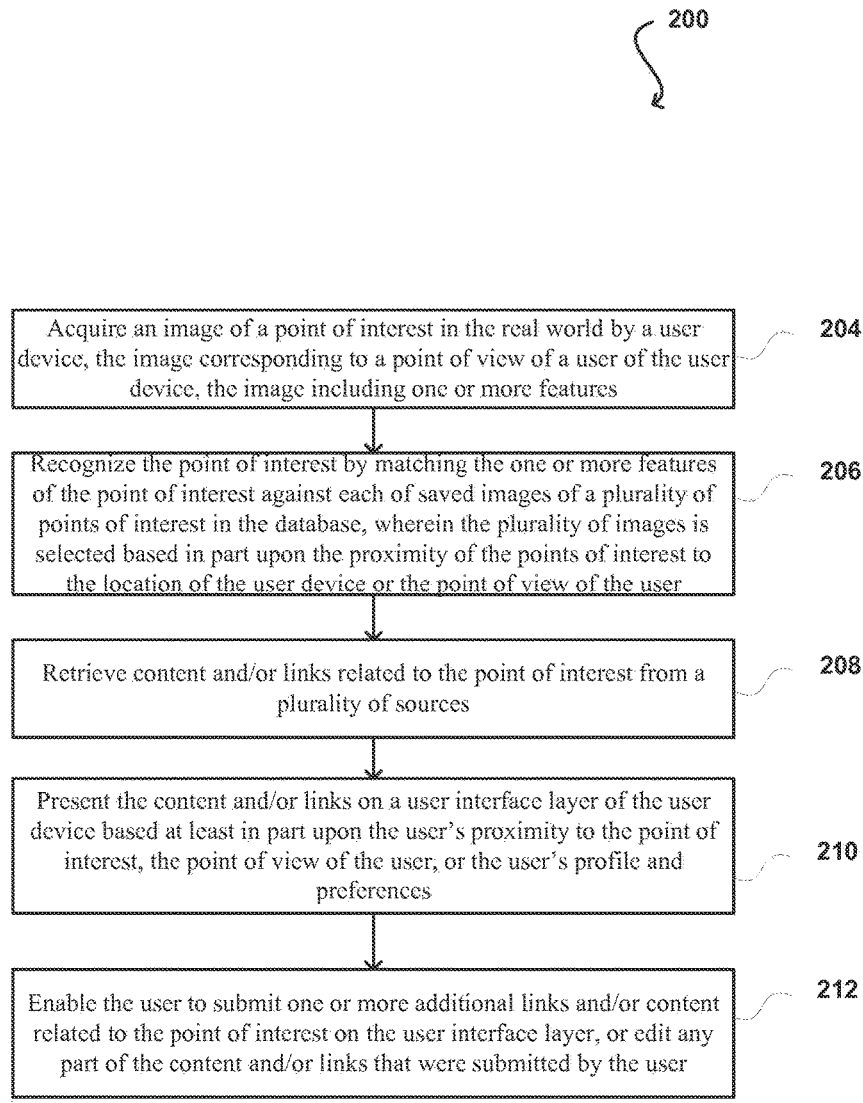
FIGS. 2A and 2B illustrate example processes for sharing content and links to visual elements of a point of interest that can be utilized in accordance with various embodiments.

FIG. 2A illustrates an example process 200 for sharing content and links to visual features of a point of interest that can be utilized in accordance with various embodiments. It should be understood that there can be additional, fewer, or alternative steps performed in similar or alternative orders, or in parallel, within the scope of the various embodiments unless otherwise stated. The example method embodiment 200 starts with capturing an image of a point of interest in the real world by a user device, at step 204. The image corresponds to a point of view from a user of the user device. The point of view of the user can be determined based at least in part upon one of GPS locations, IMU orientations, or compass data of the user device. The image may have one or more features for image matching and recognitions. In some embodiments, the one or more features may be used as one or more anchor points in an augmented reality environment for users to attach comment and/or links associated with the point of interest.

The point of interest can be recognized by matching the one or more features of the point of interest against each of saved images of a plurality of points of interest in the database, at step 206. In some embodiments, the plurality of images used in the image recognition and matching process are selected based at least in part upon the proximity of the points of interest to the location of the user device or the point of view of the user. Directional cues may be provided on a user interface layer of the user device for points of interests that are not in the point of view of the user. At step 208, content, files, and/or links related to the point of interest are retrieved from the database. In some embodiments, the content, files, and/or links can be retrieved directly from various types of sources, such as, the database, social networking sites, newspapers and magazines, search engines, local directory services, and/or third party service providers. The content, files, and/or links can be subject matters of the point of interest such as, attractions of the point of interest, instant or daily specials, recommendations on specific items, hyperlinks to reviews of the point of interest on third party review sites, or other alternative point of interest (e.g., proximity, or reviews) based on user's profile and preferences.

At step 210, the retrieved content, files, and/or links can be presented on an interface layer of the user device based at least in part upon the user's proximity to the point of interest, the point of view of the user, or the user's profile and preferences. The user can submit one or more additional links, content, and/or files on the interface layer, or edit any part of the links, content, and/or files that were submitted by the user, at step 212.

Various other types of methods to share or present content and links to visual elements of a point of interest based at least in part upon a user's proximity to the point of interest, a view of the user, or the user's profile and preferences are also possible, some of which are discussed in further detail elsewhere herein.

Figure 2B:
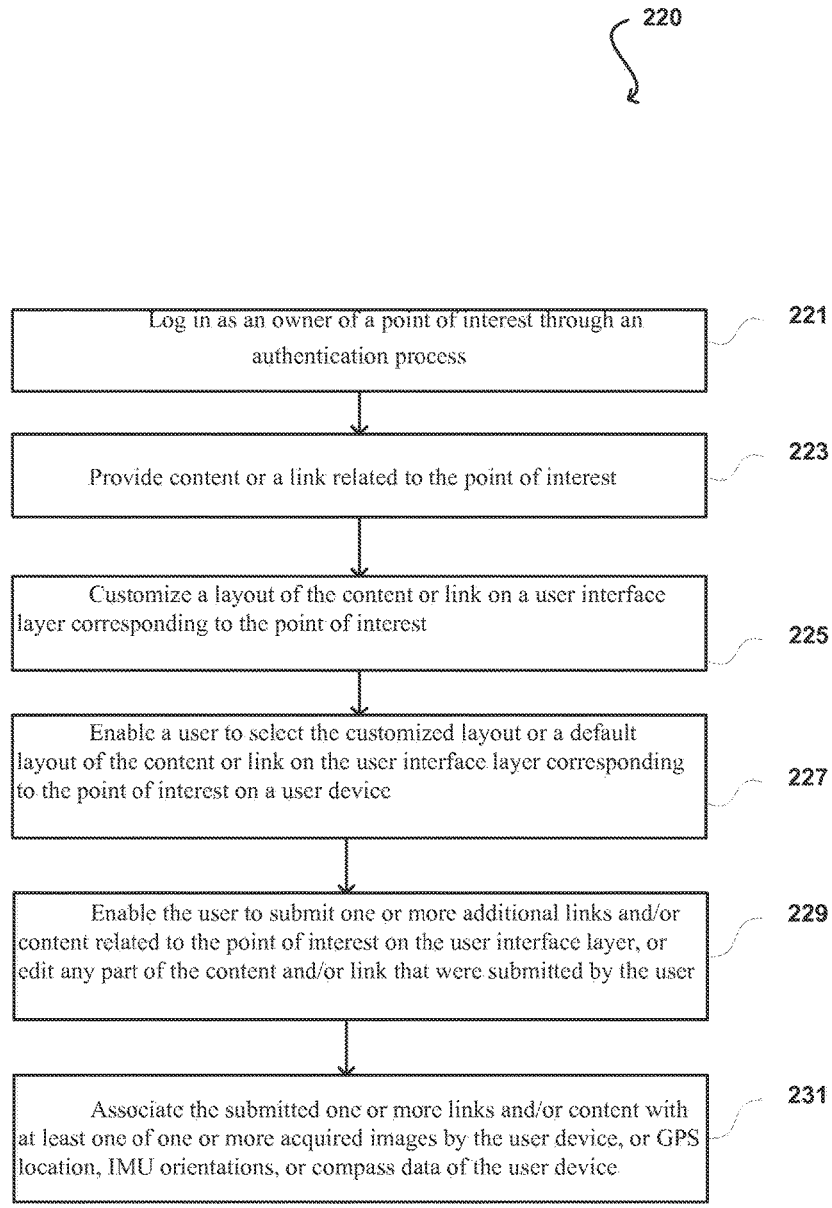

FIG. 2B illustrates an example process 220 for sharing content and links to a point of interest that can be utilized in accordance with various embodiments. It should be understood that there can be additional, fewer, or alternative steps performed in similar or alternative orders, or in parallel, within the scope of the various embodiments unless otherwise stated. The example method embodiment 220 starts with logging in as an owner of a point of interest through an authentication process, at step 221. The owner may have to answer correctly a series of questions relating to the history of the point of interest or information listed in an owner record for the point of interest. Once the owner gets authenticated, the owner can provide content or a link relating to the point of interest in an augmented reality environment, at step 223. The owner can customize a layout of the content or link on a user interface layer corresponding to the point of interest, at step 225. A user can select the customized layout or a default layout of the content or link on the user interface layer corresponding to the point of interest on a user device, at step 227. The user can submit one or more links and/or content relating to the point of interest on the user interface layer, or edit any of the content and/or link that were submitted by the user, at step 229. The submitted one or more links and/or content are associated with at least one of one or more acquired images by the user device, or GPS location, IMU orientations, or compass data of the user device, at step 231. In some embodiments, an owner of a point of interest can control at least in part how the content or links can be presented (e.g., a canvas or overlay, a layout of markers, or how many links attached to each marker) to users in an augmented reality environment, or what types of content and link can be attached to the point of interest.

Figure 3A:
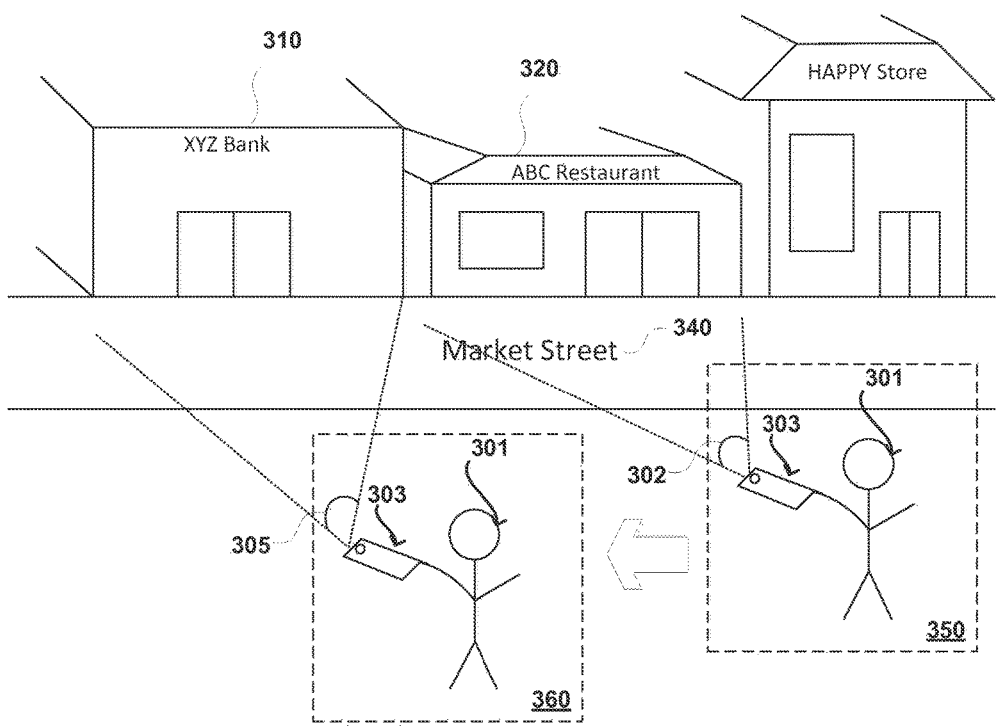
FIG. 3A illustrates an example of points of interest as a user is moving through in the real world in accordance with various embodiments.

FIG. 3A illustrates an example of points of interest as a user is moving through in the real world in accordance with various embodiments. In this example, a user 301 is operating a computing device 303 incorporating one or more imaging capturing element (not shown) and walking along the Market Street 340 from the position 350 to another position 360. At the position 350, the computing device 303 has a viewing angle 302 that is able to capture an image of at least a substantial portion of the ABC Restaurant 320 such that the ABC Restaurant 320 is in the center of the viewing angle 302. At the position 360, the computing device 303 has a viewing angle 305 that is able to capture an image of at least a substantial portion of the XYZ Bank 310 such that the XYZ Bank 310 is in the center of the viewing angle 305.

A backend server can be configured to store a plurality of images related to various points of interest, along with location and point of view data (e.g., GPS location, IMU orientations and compass data) describing the point of view when each image was taken. In some embodiments, the images and point of view data can be collected through crowd-sourcing or by a fleet of vehicles. In some embodiments, each stored image has attached content and/or links that were previously submitted associated with specific features in the image. In this example, when the user 301 visits the point of interest (e.g., the ABC Restaurant 320 and the XYZ Bank 310) and points the computing device 303 at the point of interest, the computing device 303 can upload a camera image along with location and point of interest data to the backend server.

Based at least upon the location and point of direction of the computing device 303, the backend server can choose a candidate set of stored images for image recognition and matching. In some embodiments, the candidate set of images may share at least a common feature with the images taken by the computing device 303, or similar enough to the location and point of direction of the computing device 303. The backend server can then perform image recognition and matching between the images taken by the computing device 303 and each of the candidate set of images, and also calculate a confidence score for each of the candidate set of images. A candidate image, along with content and links associated with the image, which has the highest confidence score can be provided as a fiducial (e.g., a unique image, or a set of feature points describing the unique image) for recognition and tracking. In some embodiments, the computing device 303 can recognize the fiducial in the live camera view and dynamically track the changes to the camera view due to the movement of the computing device 303.

Figure 3B:
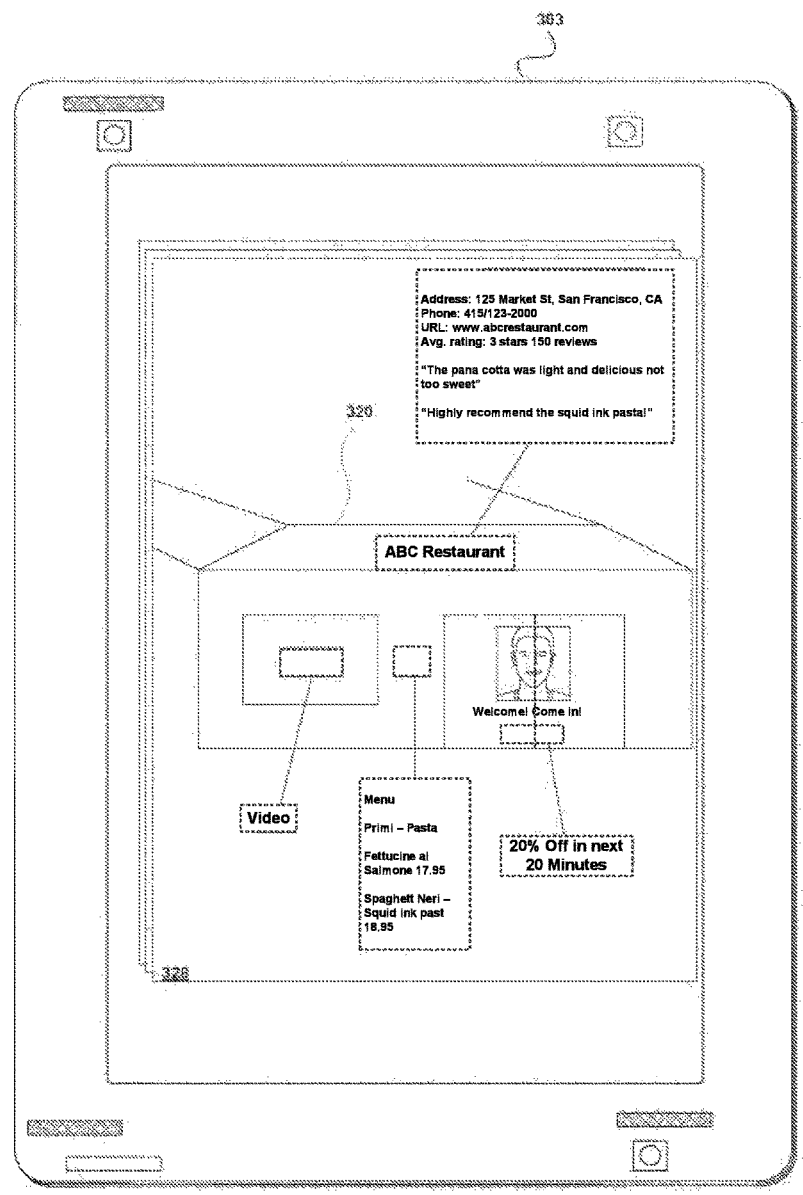
FIGS. 3B and 3C illustrate examples of unique images of a point of interest in accordance with various embodiments.
Figure 3C:
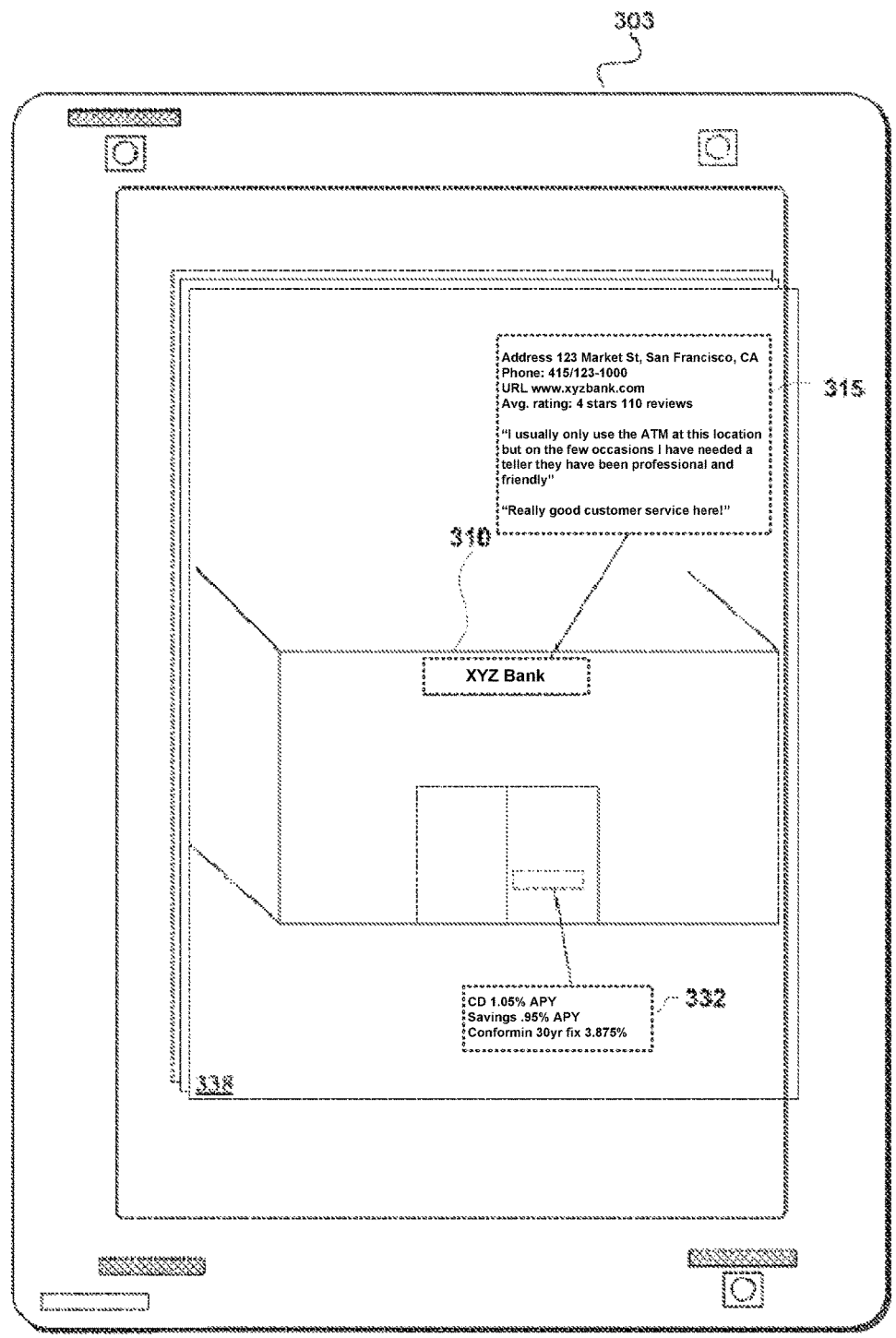

FIGS. 3B and 3C illustrate examples of different unique images of a point of interest that are presented on the computing device 303 as the user 301 is walking from the position 350 to the position 360 in accordance with various embodiments. As illustrated in FIG. 3B, a unique image 328 of the ABC Restaurant 320, along with content and links associated with the image, is presented on the computing device 303. The unique image 328 may be selected from a plurality of images that were taken by different users under various conditions (e.g., different weather and light conditions, or different points of view). As illustrated in FIG. 3C, when the user 301 moves along the street from the position 350 to the position 360, a different unique image 338, along with content (e.g., displayed by the billboards 315 and 332), can be selected from a different set of images that corresponds to the new location 360 and the new point of direction of the computing device 303.

In some embodiments, a client computing device or a augmented reality system is configured to detect a significant change (e.g., a user walks along a street or moves to a different side of a point of interest, or tracking failure) in the point of view from the client computing device. In response to the changes, a different set of candidate images can be retrieved from the backend server for image recognition and matching. The candidate image with the highest confidence score can be dynamically chosen as a new fiducial and used for subsequent tracking.

In some instances, two or more points of interest (e.g., adjacent stores) may be present in the camera image of a client computing device, the client computing device or the augmented reality system is configured to simultaneously retrieve candidate images for image recognition and matching of the two or more points of view. Two or more fiducials, along with attached content and links, may be presented together on the camera view of the client computing device.

Figure 4:
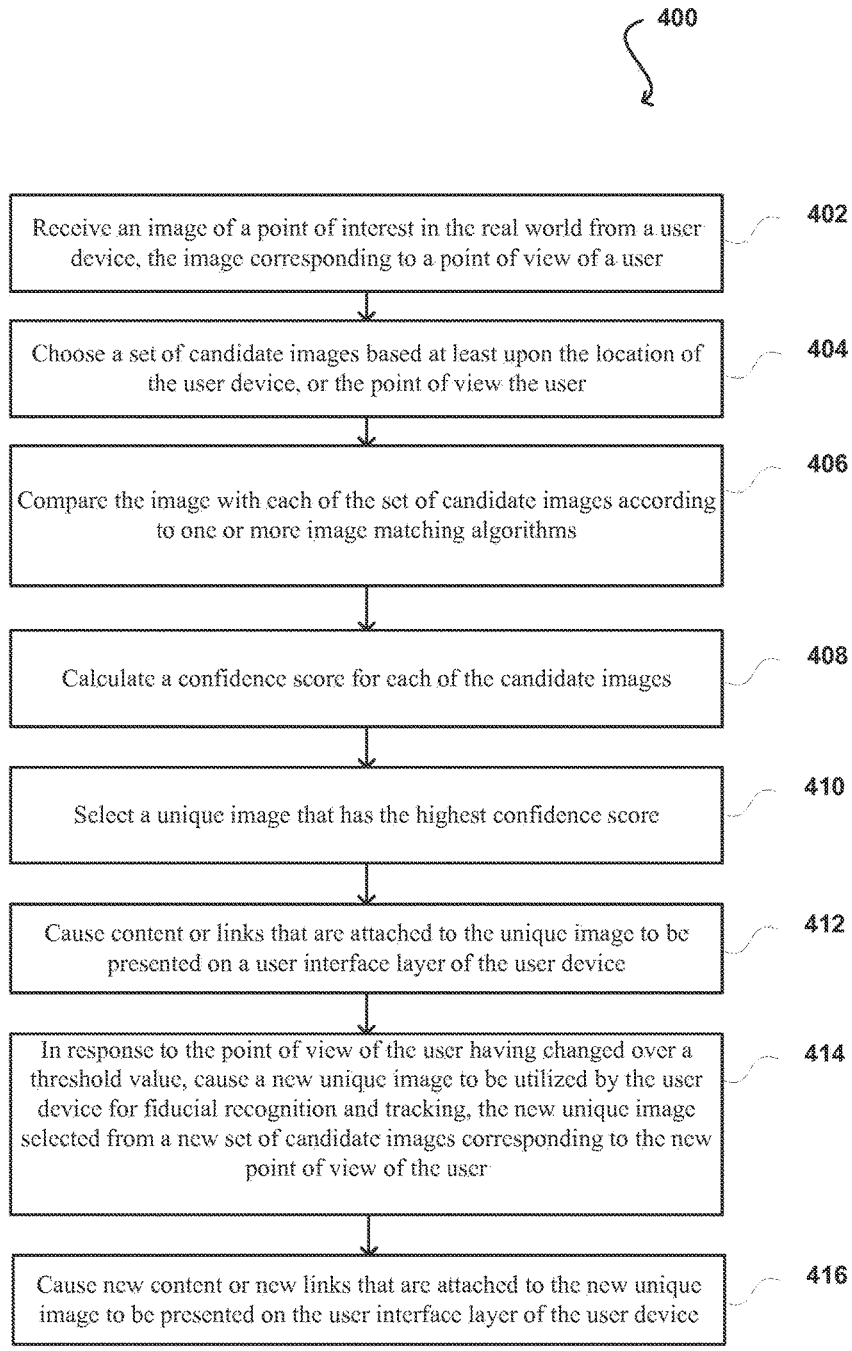
FIG. 4 illustrates an example process for choosing a unique image of a point of interest that can be utilized in accordance with various embodiments.

FIG. 4 illustrates an example process for choosing a unique image of a point of interest that can be utilized in accordance with various embodiments. It should be understood that there can be additional, fewer, or alternative steps performed in similar or alternative orders, or in parallel, within the scope of the various embodiments unless otherwise stated. The example method embodiment 400 starts with receiving an image of a point of interest in the real world from a user device, at step 402. The image corresponds to a point of view from a user of the user device and may have one or more features for image matching and recognition. The point of view of the user can be determined based at least in part upon GPS locations, IMU orientations, or compass data of the user device. At step 404, a set of candidate images can be chosen based at least upon the location of the user device, or the point of view of the user.

The received image can be compared with each of the candidate images according to one or more image matching algorithms, at step 406. In many instances, the candidate images may be taken at different times of day and/or under different weather conditions. A confidence score is calculated for each candidate image, at step 408. A unique image, which has the highest confidence score, can be chosen, at step 410. Content or links attached to the unique image can be presented on a user interface layer of the user device, at step 412. At step 414, in response to the point of view of the users having changed over threshold value, a new unique image can be utilized by the user device for fiducial recognition and tracking, and this new image might have the same or different links and content as the previous unique image. A new unique image with the same content or links might represent a different point of view of the same point of interest. The new unique image is selected from a new set of candidate images that corresponds to the location of the user device, and the new point of view of the user. At step 416, new content or new links attached to the new unique image can be presented on the user interface of the user device.

Figure 5:
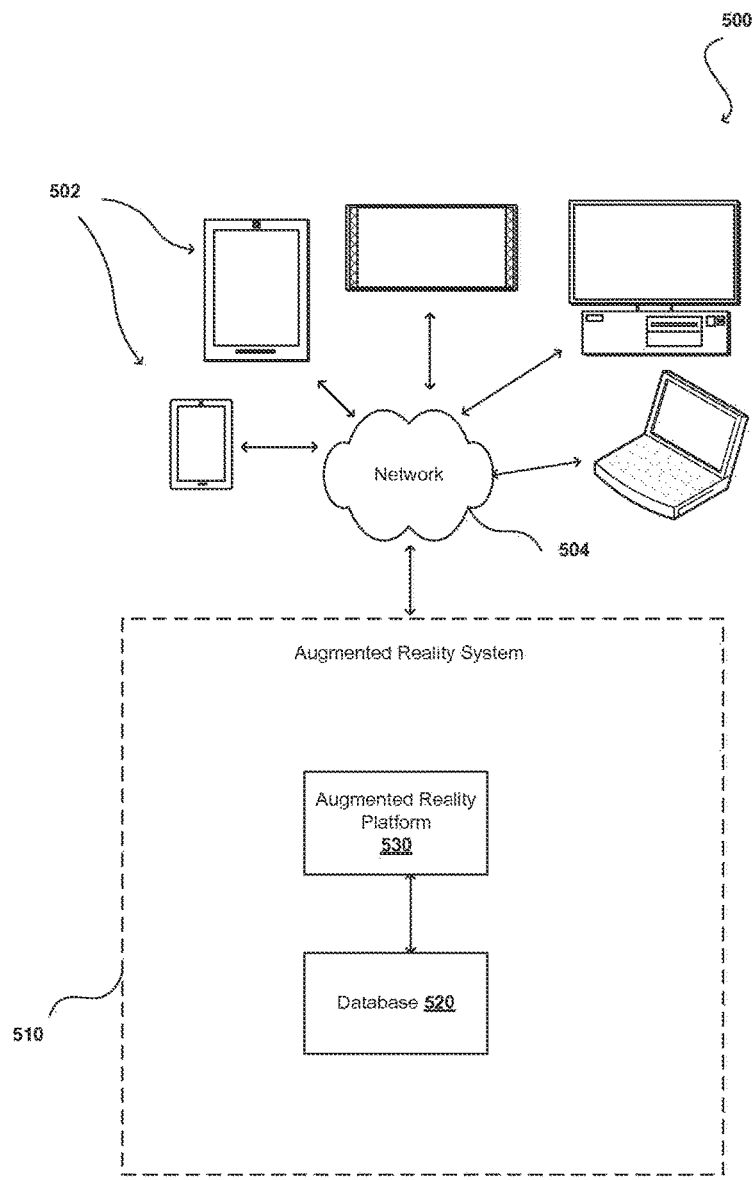
FIG. 5 illustrates an example of an augmented reality system for recognizing and tracking a point of interest in the real world in accordance with various embodiments.

FIG. 5 illustrates an example 500 of an augmented reality system 510 for recognizing and tracking a point of interest in the real world in accordance with various embodiments The augmented reality platform 530 communicates with the client computing devices 502 via the network 504. Although only some client computing devices 502 are shown in FIG. 5, it should be understood that various other types of electronic or computing devices that are capable of receiving, or rendering a web application in accordance with various embodiments are discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

In some embodiments, the augmented reality platform 530 provides a web service allowing users to search and discover links and other content (e.g., reviews, menus, video, chat walls, contact information, URLs) that are tied to unique visual features at a point of interest in the real world. The client computing devices 502 can display those links and content as augmented reality content on the display screen or the camera preview screen. On the production side, the augmented reality system 530 enables users or an owner of point of interest to submit or upload links and/or contents related to the point of interest to the database 520. The links and/or contents are tied to at least one of the point of view (e.g., GPS location, IMU orientation, and compass) from the client computing device 502, or image features of the point of interest. On the consumption side, users in the real world can discover the links and/or content related to the point of interest by pointing the client computing device 502 at the point of interest. The links and/or content related to the point of interest can be presented on as content augmenting a camera preview of the real world.

In some embodiments, the augmented reality platform 530 enables users to submit multiple and varied points of view of the same point of interest. In some instances, submitted points of view are taken under different weather conditions. As a user moves along in the real world, the augmented reality system 530 can recognize and match features in the real-time image against images that are attached to the points of interest in the vicinity of the client computing device 502 or within the point of view of the user. Candidates images together with attached content and/or links can be dynamically selected, even when points of view of the user is moving and the real-time image is different from the saved images. The augmented reality platform 530 can calculate a confidence score for each candidate image by matching the candidate image against the real-time image and provide a stored image with the highest confidence score for the user to use as a fiducial for recognition and tracking, along with the content and/links associate with the point of interest.

Figures 6A, 6B:
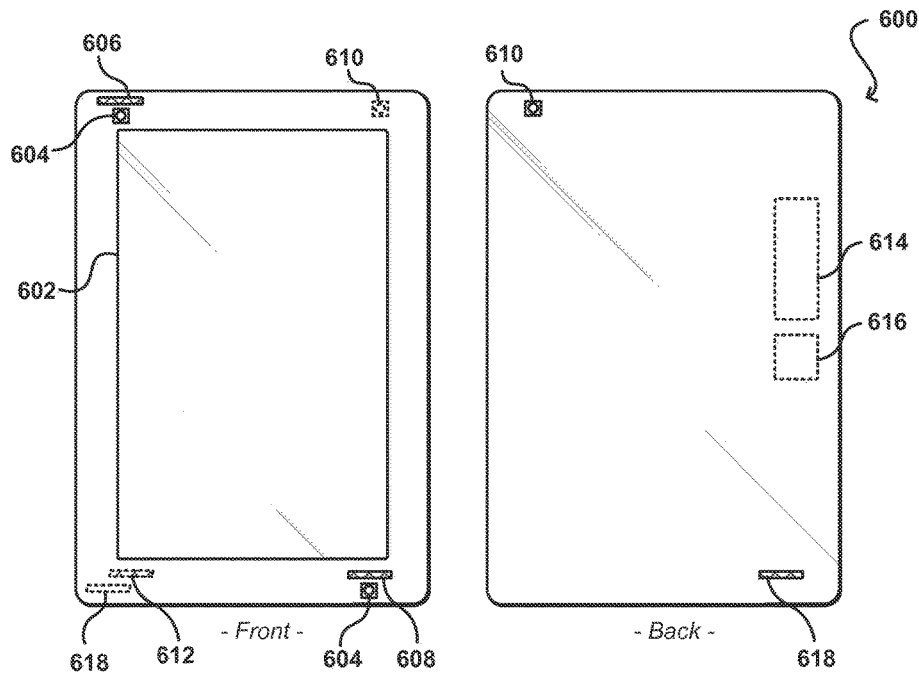
FIGS. 6A and 6B illustrates an example computing device that can be used to implement aspects of the various embodiments.

FIGS. 6A and 6B illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media files in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 600 has a display screen 602 (e.g., an LCD element) operable to display information or image content to one or more users or viewers of the device. The display screen of some embodiments displays information (e.g., streaming media file) to the viewer facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation or position-determining elements 618 operable to provide information such as a position, direction, motion, or orientation of the device. These elements can include, for example, accelerometers, inertial sensors, electronic gyroscopes, and electronic compasses.

The example device also includes at least one computing mechanism 614, such as at least one wired or wireless component operable to communicate with one or more electronic devices. The device also includes a power system 616, such as may include a battery operable to be recharged through all plug-in approaches, or through other approaches such as capacitive charging through proximity with a power mat or other such device. Various other elements and/or combinations are possible as well within the scope of various embodiments.

Figure 7:
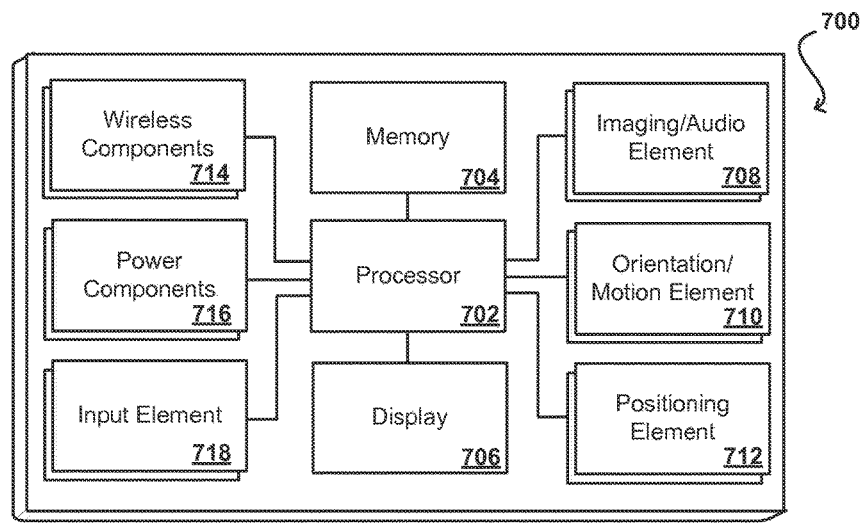
FIG. 7 illustrates example components of a computing device such as that illustrated in FIG. 6, in accordance with various embodiments.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of computing approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers. The display element 706 is capable of displaying streaming media files or other information to viewers facing the display element 706.

As discussed, the device in many embodiments will include at least one imaging/audio element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation/motion determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. In some embodiments, the example computing device 700 may also include a low power, low resolution imaging element to capture image data. The low resolution imaging element can transmit the captured image data over a low bandwidth bus, such as an I2C bus, to a low power processor, such as a PIC-class processor. The PIC processor may also communicate with other components of the computing device 700, such as Orientation Motion Element 710, etc. The PIC processor can analyze the image data from the low resolution imaging element and other components of the computing device 700 to determine whether the head motion likely corresponds to a recognized head gesture. If the PIC processor determines that the head motion likely corresponds to a recognize head gesture, the PIC processor can enable other image element to activate high resolution image capture and/or main processor to analyze the capture high resolution image data.

The example device also includes one or more wireless components 714 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 716, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 718 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 8:
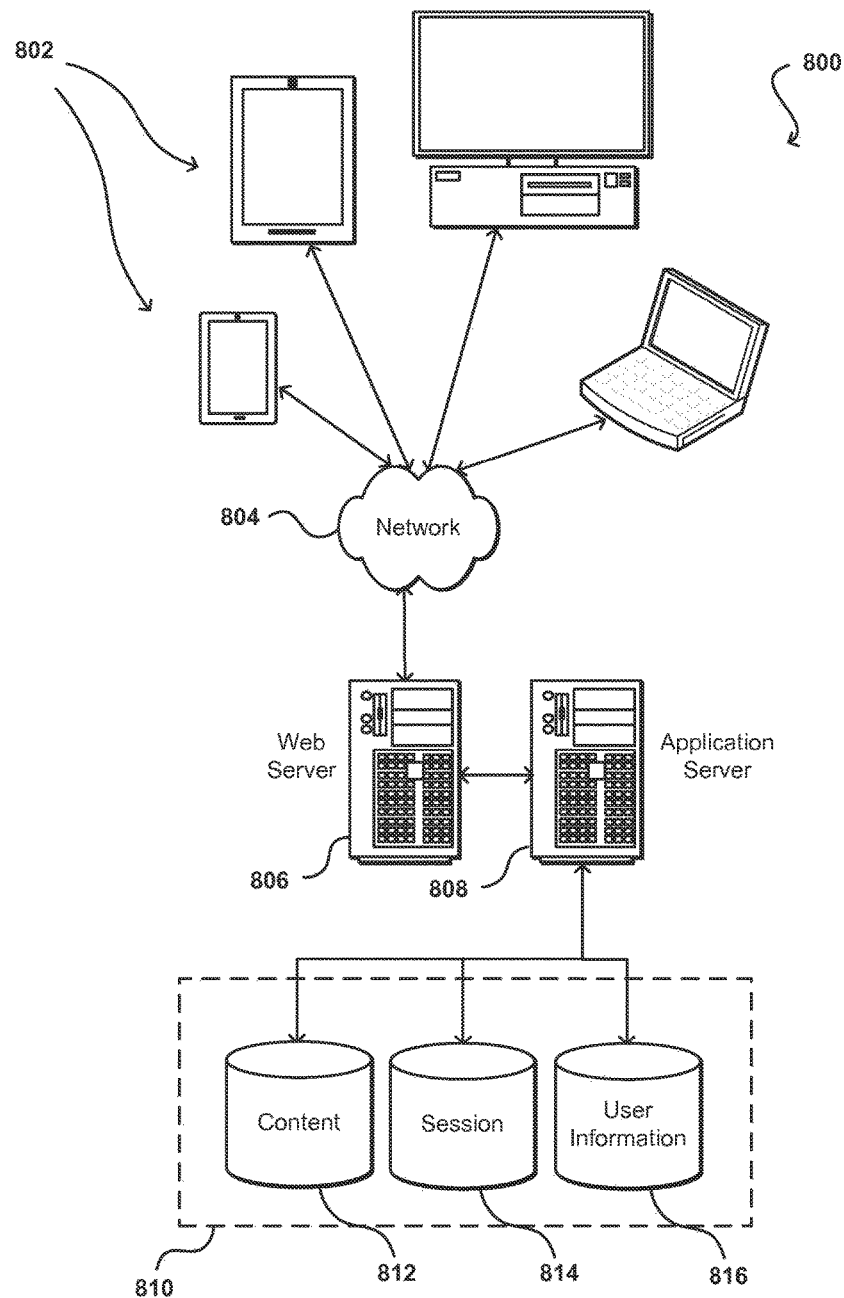
FIG. 8 illustrates an environment in which various embodiments can be implemented in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic computing device 802, which can include any appropriate device operable to send and receive requests, messages or information over an appropriate network 804 and convey information back to a user of the device. Examples of such computing devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the computing device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The user information 816 may include user preference, historical data, user demographic data, and audio system of the user devices associated with users. Demographic data of users may include user age, user gender, user educational background, user marital status, user income level, user ethnicity, user postal code, user primary language, or user spending habit. The audio system may include headphone (e.g., earphone, ear bud, and the like), speaker (e.g., tablet speaker, blue tooth speaker, computer speaker, bookshelf speaker, center-channel speaker, floor speaker, in-wall and in-ceiling speaker, outdoor speaker, sound bar, portable speaker, and woofer/sub-woofer speaker), or various types of audio amplifiers. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    acquiring, by a computing device, an image of a point of interest, the image representing at least a partial view of the point of interest corresponding to a point of view of an image capture element of the computing device, the image including one or more visual features;
    comparing the one or more visual features to a plurality of candidate images to identify, based at least in part upon a respective confidence score of at least one candidate image, the point of interest;
    causing at least one link or content to be presented on a user interface layer of the computing device based at least in part upon a distance between the computing device and the point of interest, the point of view of the image capture element, a user's profile, or a profile of an owner of the point of interest, wherein the user interface layer includes at least one overlay level over a live video or still image view and at least one level of transparency; and
    enabling the user to customize the user interface layer corresponding to the point of interest by associating one of one or more additional links or additional content to the point of interest and presenting the one of one or more additional links or additional content on the user interface layer.

2. The computer-implemented method of claim 1, wherein the customized presentation of one of the at least one link or content on the user interface layer includes at least one of glowing effect, bold effect, billboard effect, or a visual three-dimensional element.

3. The computer-implemented method of claim 1, further comprising:
    receiving a selection of at least one display area on the user interface layer; and
    associating at least one additional link or additional content to the point of interest at a location corresponding to the at least one display area.

4. The computer-implemented method of claim 1, further comprising:
    determining the point of view of the user based at least in part upon one of Global Positioning System (GPS) locations, Inertial Measurement Unit (IMU) orientations, compass data, or one or more visual matching algorithms.

5. The computer-implemented method of claim 1, wherein each image from the plurality of candidate images is associated with at least one location that is in a proximity of a location of the computing device.

6. The computer-implemented method of claim 1, wherein the at least one link or content includes at least one of promotional coupons, menus, advertisements, reservation systems, floor plans, videos, customer reviews, music, chat walls, audio, wait time, attractions of the point of interest, instant or daily specials, recommendations on specific items, hyperlinks to reviews of the place on third party review sites, or alternative points of interest.

7. A non-transitory computer-readable storage medium including instructions that, when executed by at least one processor of a computing system, cause the computing system to:

acquire an image of a point of interest, the image representing at least a partial view of the point of interest corresponding to a point of view of an image capture element of a computing device, the image including one or more visual features;

compare the one or more visual features to a plurality of candidate images to identify, based at least in part upon a respective confidence score of at least one candidate image, the point of interest;

cause at least one link or content to be presented on a user interface layer of the computing device based at least in part upon a distance between the computing device and the point of interest, the point of view of the image capture element, a user's profile, or a profile of an owner of the point of interest, wherein the user interface layer includes at least one overlay level over a live video or still image view and at least one level of transparency; and enable the user to customize the user interface layer corresponding to the point of interest by associating one of one or more additional links or additional content to the point of interest and presenting the one of one or more additional links or additional content on the user interface layer.

8. The non-transitory computer-readable storage medium of claim 7, wherein the customized presentation of one of the at least one link or content on the user interface layer includes at least one of glowing effect, bold effect, billboard effect, or a visual three-dimensional element.

9. The non-transitory computer-readable storage medium of claim 7, wherein the instructions, when executed by the at least one processor of the computing system, further cause the computing system to:

receive a selection of at least one display area on the user interface layer;

associate at least one additional link or additional content to the point of interest at a location corresponding to the at least one display area.

10. The non-transitory computer-readable storage medium of claim 7, wherein the instructions, when executed by the at least one processor of the computing system, further cause the computing system to:

determine the point of view of the user based at least in part upon one of Global Positioning System (GPS) locations, Inertial Measurement Unit (IMU) orientations, compass data, or one or more visual matching algorithms.

11. The non-transitory computer-readable storage medium of claim 7, wherein each image from the plurality of candidate images is associated with at least one location that is in a proximity of a location of the computing device.

12. The non-transitory computer-readable storage medium of claim 7, wherein the at least one link or content includes at least one of promotional coupons, menus, advertisements, reservation systems, floor plans, videos, customer reviews, music, chat walls, audio, wait time, attractions of the point of interest, instant or daily specials, recommendations on specific items, hyperlinks to reviews of the place on third party review sites, or alternative points of interest.

13. A system, comprising:
an image capture element;
a display;
at least one processor; and
memory including instructions that, when executed by the at least one processor, cause the system to:

acquire an image of a point of interest, the image representing at least a partial view of the point of interest corresponding to a point of view of the image capture element, the image including one or more visual features;

compare the one or more visual features to a plurality of candidate images to identify, based at least in part upon a respective confidence score of at least one candidate image, the point of interest;

cause at least one link or content to be presented on a user interface layer of the display based at least in part upon a distance between the system and the point of interest, the point of view of the image capture element, a user's profile, or a profile of an owner of the point of interest, wherein the user interface layer includes at least one overlay level over a live video or still image view and at least one level of transparency; and enable the user to customize the user interface layer corresponding to the point of interest by associating one of one or more additional links or additional content to the point of interest and presenting the one of one or more additional links or additional content on the user interface layer.

14. The system of claim 13, wherein a customized presentation of one of the at least one link or content on the user interface layer includes at least one of glowing effect, bold effect, billboard effect, or a visual three-dimensional element.

15. The system of claim 13, wherein the instructions, when executed by the at least one processor of the computing system, further cause the system to:

receive a selection of at least one display area on the user interface layer;

associate at least one additional link or additional content to the point of interest at a location corresponding to the at least one display area.

16. The system of claim 13, wherein the instructions, when executed by the at least one processor of the computing system, further cause the computing system to:

determine the point of view of the user based at least in part upon one of Global Positioning System (GPS) locations, Inertial Measurement Unit (IMU) orientations, compass data, or one or more visual matching algorithms.

17. The system of claim 13, wherein each image from the plurality of candidate images is associated with at least one location that is in a proximity of a location of the system.

* * * * *